Sept. 11, 1962   J. VILLORESI   3,053,312
FLOATING SEAT BLOWPIPE NOZZLE
Filed April 27, 1960
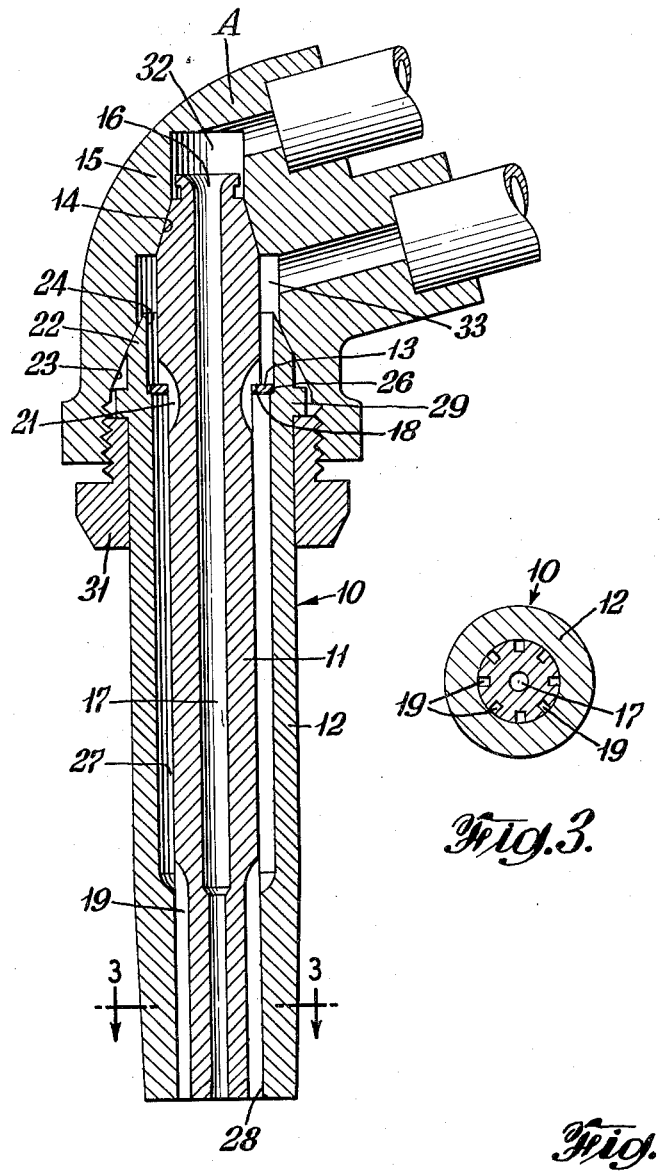
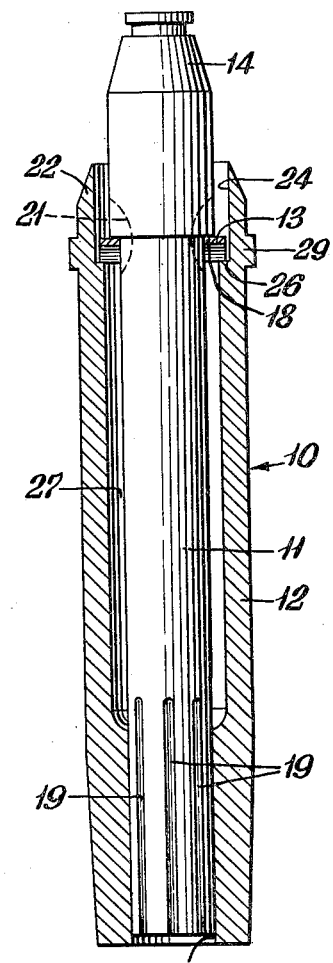
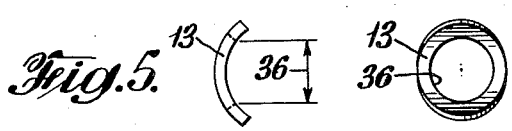
INVENTOR
JOHN VILLORESI
BY William F. Mesinger
ATTORNEY

United States Patent Office 3,053,312
Patented Sept. 11, 1962

3,053,312
FLOATING SEAT BLOWPIPE NOZZLE
John Villoresi, Lincoln Park, N.J., assignor to Union Carbide Corporation, a corporation of New York
Filed Apr. 27, 1960, Ser. No. 25,091
4 Claims. (Cl. 158—27.4)

This invention relates to blowpipe nozzles particularly adapted for use in thermochemical cutting operations. It more specifically relates to such a nozzle comprising a plurality of co-acting parts.

Conventional cutting nozzles generally provide at the gas inlet, inner and outer frustro-conical seating surfaces which separate the cutting oxygen from the pre-heat gases and the pre-heat gases from the atmosphere, said surfaces being formed or machined on a single nozzle member. Consequently, substantially perfect alignment of the upper and lower seating surfaces, both in the blowpipe head and on the nozzle, is required to ensure obtaining satisfactory gas-tight sealing between the mating head and nozzle. In fabricating such nozzles, precision machining with very close dimensional and angular tolerances is essential in order to achieve the necessary degree of seat alignment. With subsequent wear resulting from usage, this sealing problem becomes progressively more difficult. When this occurs, it becomes necessary to "reseat" either the head of the blowpipe, the nozzle, or even both, to assure a gas-tight seal of both frustro-conical seats. This can be a costly and time-consuming procedure.

It is therefore an object of this invention to provide a blowpipe nozzle of the multi-seal type having sufficient flexibility to assure a positive, gas-tight, metal-to-metal seal of each seat with the respective blowpipe surface.

A further object is to provide a blowpipe nozzle having multiple sealing surfaces which are axially and longitudinally independent of each other for permitting each of said surfaces to align itself with a mating blowpipe surface.

In the drawings:

FIG. 1 is a view of a longitudinal cross-section of the present nozzle, shown mounted in a blowpipe head;

FIG. 2 is a view of the nozzle of FIG. 1, partially cross-sectioned, and shown in unmounted position;

FIG. 3 is a sectional view taken along line 3—3 of FIG. 1;

FIG. 4 is a front elevation view of the spring member utilized in the nozzle; and FIG. 5 is a side view of the member shown in FIG. 4.

In brief, the present invention contemplates an elongated blowpipe nozzle having a gas inlet end comprising axially spaced frustro-conical seates, said seats being respectively disposed on a central core member 11 having a gas passage axially therethrough, and a tubular member 12 outwardly spaced from the central member to define an annular gas passage therebetween. A flexible washer-like resilient spring member 13 disposed in said annular passage co-operatively positions said members to permit a degree of both axial and radial resiliency when said nozzle is registered with, and fastened into a mating blowpipe head, thereby forming a positive metal-to-metal gas seal.

Referring to FIGS. 1 and 2, the inner member 11 is provided with a rearwardly disposed frustro-conical seating surface 14 adapted to intimately fit a mating seat 15 in the blowpipe head unit A. A flared mouth 16 on the rear fact of said member 11 leads to an axial passage 17 extending therethrough for delivering cutting oxygen to the surface being treated. The forward cylindrical end of the inner core 11 is provided with a plurality of elongated slots 19, which end slidably registers in the outlet port 28 of member 11 to provide a series of gas ports for directing pre-heat gas onto the surface to be treated. Said slots extend rearwardly a sufficient distance to communicate with the annular passage 27. Slightly forward of said frustro-conical seating surface 14, a peripheral shoulder 18 is provided on the outer surface of said inner member. A plurality of arcuate slots 21 formed into the inner member, straddle the shoulder 18 to permit forward flow of gas which would otherwise be blocked by the spring 13.

The outer member 12, according to the invention, comprises a metallic, tubular unit, partially sheathing the inner member 11 thereby permitting the rear seating surface 14 of said inner member 11 to protrude therefrom. A rearwardly disposed frustro-conical seating surface 22 is provided on the outer surface of said member 12, a stepped annular recess 24 defines an inwardly protruding shoulder 26 positioned approximately adjacent the inner member shoulder 18. This annular recess 24 provides the outer wall of the elongated gas chamber 27, its front end being bored to provide the aforementioned sliding contact and define the pre-heat ports. Forwardly, adjacent the seating section 22, an annular circumferential shoulder 29 provides an abutment for ring nut 31 whereby said nut may threadably engage the formed threads of blowpipe head A and thus draw the nozzle into concentric seating surfaces 15 and 23 of said blowpipe head.

The spring member 13, as shown in FIGS. 4 and 5, is generally washer-like in shape, and disposed in the annular space 27 intermediate shoulders 18 and 26, thereby positioning said members in substantially concentric relationship. The present usage of the term "concentric" being that the circular cross-sections of inner and outer members share a substantially common point. The spring 13, as shown in FIG. 1, mutually abuts the substantially concentric and adjacent shoulders 18 and 26 in a strained or flattened condition, whereby a rearward force due to said strained condition is exerted on the inner member 11. This spring is preferably fabricated of any suitable material which will reform after being strained; for instance, it has been found that spring steel or phosphorous bronze are characterized by a high degree of resiliency and provide satisfactory gas sealing.

In the normal assembly of a blowpipe containing a nozzle as described, before being inserted therein, the nozzle parts are in spacial relationship as illustrated in FIG. 2 with inner member 11 and outer member 12 being maintained in a yieldably concentric spaced relationship by virtue of the resilient spring 13 therebetween. The blowpipe head A normally consists of a chamber 32 containing cutting oxygen and an annular chamber 33 forwardly disposed of said cutting oxygen chamber, containing the combustible pre-heat gas mix. Concentric seating surfaces 15 and 23, providing entrance to said chambers, are frustro-conical in accordance with the mating nozzle seats to permit proper self-alignment of said seats as the nozzle advances into the blowpipe head.

In assembling the described nozzle to a blowpipe head, the operation is usually commenced with the ring nut 31 removed, and the head seats 15 and 23 free of dust or foreign matter which might prevent a tight seal being made. The nozzle itself may be pre-assembled prior to insertion into the head, or this may be accomplished in separate steps. For the description to follow, the former method has been found to be more convenient.

The spring 13, as shown in FIG. 2, is positioned adjacent shoulder 18 of the inner member 11, the center opening 36 being sufficiently large to permit slight lateral movement. Both of said pieces are now passed into the annular recess 24 of outer member 12 until spring 13 abuttingly contacts the shoulder 26 of said outer member. The tip or front edge of the nozzle will now be as shown in FIG. 2 with the inner member slightly set back from the forward plane surface of the outer member. The ring nut 31 is next placed about the outer member and passed from the nozzle tip in a rearward direction to abut flange 29. This nut, in accordance with usual practice is disposed such that its threads are toward the rear of the nozzle and adaptable to engage the externally threaded section head A.

In progressing the ring nut 31 along the threaded section of head A, both outer member 12 and inner member 11 advance simultaneously until the inner member 11 first contacts its mating seat 15 in the head recess and becomes aligned therein due to the yieldable, resilient relationship provided by the spring. At this point, said spring 13 is in an unstrained position, as shown in FIGS. 4 and 5, and the outer member 12 is floating free of its mating seat 23 in the head section A.

Upon further tightening of the nut 31, the outer member will advance and cause seat 22 to contact its conical mating surface 23, becoming sufficiently aligned therein. During this latter movement, the inner member has remained stationary. The resulting relative displacement of the inner and outer members compresses the spring 13 which thereby commences to become flattened out as illustrated in FIG. 1. As the flattening or deformation increases, the increasing strain will cause a corresponding, reacting force to be exerted against the inner member shoulder 18 thereby providing a more firm seat against seat 15 in the blowpipe head. The ring nut 31 is next advanced onto the head threads until the outer member seat 22 becomes tightly wedged in its mating head 23 and no further movement is possible.

In such a secured position, the gases entering the head section A, as for instance the cutting oxygen which enters chamber 32, may flow into the passage 16 of the inner member 11 and thence forward to the nozzle tip. The combustible or pre-heat gas mixture enters annular chamber 33, bypasses the spring 13 through communicating passages 21 and thence flows into the annular space 27 toward the nozzle tip where it is discharged by way of slots 19.

It is therefore seen that the resiliently yieldable axial relationship existing between inner and outer members not only assures proper alignment, but provides satisfactory sealing with a minimum amount of tightening.

The spring 13, upon which much of the nozzle's novelty is based, is a thin, metallic member, as previously described, consisting of a wafer-like thickness of a resilient material such as spring steel or Phosphor bronze. The central opening 36 in said spring conforms to the peripheral contour of the inner member 11 forward of shoulder 18; further, the outer diameter permits the spring to be loosely received against the peripheral shoulder 26, thereby permitting lateral adjustment of the member. While the above-mentioned spring steel and phosphor have been found to provide the necessary resilience, such a limitation is not placed on the material used, for instance, any resilient metallic material might be employed, the degree of deformation attainable being determined only by the thickness and characteristics of the particular metal. An embodiment of the resilient member found to be useful in the invention resides in the use of a spring member commercially designated as a Belleville washer. This is illustrated by FIG. 4 in which it may be seen that the article, essentially wafer-like in thickness, is deformed in its horizontal plane to provide resiliency when axially compressed.

The most desirable feature of the present invention lies in the ability of the inner and outer nozzle seats to independently adjust themselves for a proper alignment in their mating head recess with only a minimum of effort on the part of a blowpipe operator. A further desirable feature is that by such a variably concentric, floating relationship, there is little need for stringent manufacturing tolerances on the nozzle parts. Also, due to the sliding, longitudinal relationship of the respective nozzle members, excessive tightening of the outer member will not tend to damage the inner seating surface.

While the nozzle as here described is directed to a particular embodiment, it is understood that varying designs and modification may be utilized without going beyond the spirit and scope of the invention.

What is claimed is:

1. In a blowpipe, the combination of a head including a plurality of stepped bores having substantially coaxial frusto-conical seats at the entrance thereof, means for delivering to said respective bores separate streams of oxygen and a preheat gas, an elongated nozzle having opposed gas inlet and discharge ends, the nozzle inlet end engaging said stepped bores to receive flows of said oxygen and preheat gas therefrom, said nozzle comprising: a core member, a frusto-conical seat formed at the inlet end of said core, said core seat positioned in metal-to-metal sealing engagement with one of said frusto-conical seats in the head, a longitudinal passage extending through said core for receiving a flow of oxygen from one of said bores in said head, a tubular member surrounding said core and outwardly spaced therefrom to define an annular passage, said passage communicating the nozzle inlet end with the discharge end, a second frusto-conical seat formed at the inlet end of said tubular member, said second frusto-conical seat disposed in metal-to-metal contact with the other of said frusto-conical seats in said head to provide a flow of preheat gas to the annular passage, and means including a ring nut encircling said tubular member and threadably engaging the blowpipe head for urging said tubular member into gas tight engagement with said other frusto-conical seat, a resilient member disposed in said annular passage confined between opposed shoulder portions of the core and tubular member respectively, passage means in said core member adjacent said resilient member to permit passage of gas through said annular passage past said resilient member, said resilient member being axially deformable by the urging of said tubular member into its mating frusto-conical seat in the head whereby the axial force due to said urging will be transmitted to said core and thereby establish the metal-to-metal seal between the frusto-conical seat at the core inlet with the mating coaxial bore seat.

2. In a blowpipe substantially as described in claim 1 wherein the resilient member comprises a wafer spring, deformable in response to relative axial movement between said core and tubular member.

3. In a blowpipe substantially as described in claim 1 wherein the resilient member comprises a metallic washer having a wafer-like thinness and deformed to exert a force when axially compressed in response to relative axial movement between said core and tubular member.

4. In a blowpipe, the combination of a head including a plurality of stepped bores having substantially coaxial frusto-conical seats at the entrance thereof, means for delivering to said respective bores separate streams of oxygen and a preheat gas, an elongated nozzle having opposed gas inlet and discharge ends, the nozzle inlet end engaging one of said stepped bores to receive flows of said oxygen and preheat gas therefrom, said nozzle comprising: a core member, a passage extending axially therethrough, a frusto-conical seat formed at the inlet end of said core, said core seat positioned in metal-to-metal sealing engagement with one of said frusto-conical seats in the head to receive a flow of oxygen from one of said bores in said head, a peripheral shoulder formed on the outer surface of said core, longitudinal grooves in said outer surface positioned transversely of said peripheral shoulder, a tubular member positioned coaxial of said core and spaced outwardly therefrom to define an annular passage therebetween, said passage communicating the nozzle inlet end with the discharge end, a shoulder formed on the internal surface of said tubular member at a point adjacent the shoulder on said core outer surface, a second frusto-conical seat at the inlet end of said tubular member, said second frusto-conical seat disposed in metal-to-metal contact with the other of said frusto-conical seats in said head to provide a flow of preheat gas to the annular passage, and means including a ring nut encircling the tubular member and in threaded engagement with the blowpipe head to urge said tubular member into gas tight engagement with said other frusto-conical seat, a resilient spring positioned intermediate said respective core and tubular member confined axially between the peripheral shoulder formed on each of said core and tubular member, said resilient spring being axially deformable by the urging of said tubular member into its mating frusto-conical seat in the head whereby the axial force due to said urging will be transmitted through said resilient spring and to the core thereby establishing the metal-to-metal seal between the frusto-conical seat at the core inlet end with its mating coaxial bore seat.

References Cited in the file of this patent

UNITED STATES PATENTS

| | | |
|---|---|---|
| 2,484,891 | Jones | Oct. 18, 1949 |
| 2,881,826 | Spies | Apr. 14, 1959 |